(12) United States Patent
Kim

(10) Patent No.: US 12,023,992 B2
(45) Date of Patent: Jul. 2, 2024

(54) CLUTCH AND COMPRESSOR COMPRISING SAME

(71) Applicant: Hanon Systems, Daejeon (KR)

(72) Inventor: Sae Bom Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 609 days.

(21) Appl. No.: 17/284,973

(22) PCT Filed: Oct. 17, 2019

(86) PCT No.: PCT/KR2019/013654
§ 371 (c)(1),
(2) Date: Apr. 13, 2021

(87) PCT Pub. No.: WO2020/085717
PCT Pub. Date: Apr. 30, 2020

(65) Prior Publication Data
US 2021/0354532 A1 Nov. 18, 2021

(30) Foreign Application Priority Data
Oct. 22, 2018 (KR) .......................... 10-2018-0125894

(51) Int. Cl.
*F16D 27/112* (2006.01)
*B60H 1/32* (2006.01)
*F16D 27/108* (2006.01)

(52) U.S. Cl.
CPC .......... *B60H 1/3222* (2013.01); *F16D 27/108* (2013.01); *F16D 27/112* (2013.01); *F16D 2300/22* (2013.01)

(58) Field of Classification Search
CPC ... B60H 1/3222; F16D 27/108; F16D 27/112; F16D 2300/22
See application file for complete search history.

(56) References Cited

U.S. PATENT DOCUMENTS

| 4,618,047 A | 10/1986 | Kinz | |
|---|---|---|---|
| 6,823,974 B2 * | 11/2004 | Hayashi | F16D 27/14 192/209 |

FOREIGN PATENT DOCUMENTS

| CA | 1294229 C | 1/1992 |
|---|---|---|
| DE | 19740230 A1 | 3/1998 |
| DE | 112017001592 T5 | 12/2018 |
| DE | 112019002413 T5 | 1/2021 |
| EP | 1577587 A2 | 9/2005 |
| JP | 2000145826 A | 5/2000 |
| JP | 2000179582 A | 6/2000 |
| JP | 2003102238 A | 4/2003 |
| JP | 2006177502 A | 7/2006 |
| JP | 2016205532 A | 12/2016 |
| JP | 2016223600 A | 12/2016 |
| KR | 20040011069 A | 2/2004 |
| KR | 101339809 B1 | 12/2013 |
| KR | 20160132602 A | 11/2016 |
| KR | 20180099516 A | 9/2018 |
| KR | 20190001904 A | 1/2019 |
| WO | 2017010479 A1 | 1/2017 |

* cited by examiner

*Primary Examiner* — Huan Le
(74) *Attorney, Agent, or Firm* — Shumaker, Loop & Kendrick, LLP; James D. Miller

(57) ABSTRACT

The present invention relates to a clutch and a compressor comprising same, and it provides a compressor that operates with low noise and low vibration by reducing an amplitude of vibration transmitted in an axial direction of a clutch.

17 Claims, 13 Drawing Sheets

CLUTCH AND COMPRESSOR COMPRISING SAME

CROSS-REFERENCE TO RELATED PATENT APPLICATIONS

This application is a United States nation phase patent application based on PCT/KR2019/013654 filed on Oct. 17, 2019, which claims the benefit of Korean Patent Application No. 10-2018-0125894 filed on Oct. 22, 2018, the entire disclosures of which are hereby incorporated herein by reference.

TECHNICAL FIELD

The present invention relates to a clutch and a compressor comprising same, and more particularly, to a clutch for selectively connecting and separating a driving source and a rotation shaft, and a compressor comprising same.

BACKGROUND ART

In general, a vehicle is installed with an air conditioner (A/C) for cooling and heating inside. Such an air conditioner includes a compressor that compresses a low-temperature, low-pressure refrigerant supplied from an evaporator into a high-temperature, high-pressure refrigerant and sends it to a condenser.

Compressors include a reciprocating type compressor that compresses a refrigerant according to a reciprocating motion of a piston, and a rotary type compressor that performs compression while performing a rotational motion. The reciprocating type compressor includes a crank type that transmits a driving source to a plurality of pistons using a crank, and a swash plate type that transmits the driving source to a rotation shaft with a swash plate, according to the transmission method of the driving source. The rotary type compressor includes a vane rotary type using a rotating rotary shaft and a vane, and a scroll type using an orbiting scroll and a fixed scroll.

The compressor typically includes a rotation shaft that transmits a rotational force to a compression mechanism to compress a refrigerant, and a clutch that selectively connects and separates a driving source (e.g., an engine) and the rotation shaft. The compressor is configured to selectively receive power from the driving source for operation.

The compressor includes a casing, the compression mechanism that is provided inside the casing and compresses a refrigerant, the rotation shaft that transmits the rotational force to the compression mechanism from the driving source (for example, an engine) provided outside the casing, and the clutch that selectively connects and separates the driving source and the rotation shaft.

Referring to Korean Patent Publication No. 10-1339809, the clutch includes a hub that is fastened to the rotation shaft and rotatable together with the rotation shaft, a disk that is fastened to the hub and rotatable together with the hub, and a pulley that is rotated by receiving power from the driving source.

In addition, an elastic member is provided to fasten the hub and the disk. The elastic member is provided to apply an elastic force in a direction in which the disk is away from the pulley so that the disk is movable in a direction closer or away from the pulley based on the hub, while fastening the hub and the disk.

In addition, a field coil assembly is provided. It is magnetized when power is applied and moves the disk toward the pulley to contact the disk and the pulley.

Here, the hub, the elastic member, and the disk form a disk hub assembly, and the compressor according to this configuration is operated as follows.

The pulley is rotated by receiving a driving force from the driving source, and when power is applied to the field coil assembly, the disk is moved to the pulley side by a suction force caused by magnetic induction of the field coil assembly to contact the pulley.

As the disk and the pulley are bound together, the power of the driving source is transmitted to the rotation shaft through the pulley, the disk, the elastic member, and the hub.

The rotation shaft operates the compression mechanism with the transmitted power to compresses the refrigerant.

For example, when the power supply to the field coil assembly is stopped, the suction force due to magnetic induction of the field coil assembly is no longer generated, and the disk is moved in a direction away from the pulley by the elastic member to be separated from the pulley.

That is, the transmission of power from the driving source to the rotation shaft is stopped, the operation of the compression mechanism is stopped, and the compression of the refrigerant is stopped.

However, in such a conventional clutch and a compressor comprising same, noise and vibration are generated due to contact and separation between the pulley and the disk, and there is a problem that such noise and vibration is not attenuated.

That is, considerable noise and vibration are generated when the pulley and the disk collide, and the noise and vibration generated when the pulley and the disk rotate together in a contact state are transmitted to the compressor. Thus, there is a problem in that considerable noise and vibration are generated due to the repulsive force of the disk when the pulley and the disk are separated.

The present embodiment provides a clutch that operates with low noise by reducing the amplitude due to vibration transmitted in an axial direction of the clutch, and a compressor comprising same.

A clutch according to a first embodiment of the present invention includes a pulley 100 that is axially rotatably coupled to a rotation shaft 3 of a compressor and receives power from an external driving source, a hub 200 that is positioned to face the pulley 100 in an axial direction and rotated together with the rotation shaft 3, a disk 300 that is coupled to the hub 200 and rotated together, a field coil assembly 400 that is positioned inside the pulley 100 and enables the disk 300 to move relative to the pulley 100 by an electromagnetic force generated according to whether or not power is applied, an elastic member 500 that is positioned on an outer surface of the disk 300 and includes a plurality of vibration preventing portions 510 formed in a radial direction with respect to a center of the hub 200 in order to reduce the amplitude of the frequency band where abnormal noise generated by vibration transmitted when the compressor is operated, and an attenuation member 600 that is interposed between the disk 300 and the elastic member 500.

The elastic member 500 further includes a first annular portion 520 that is concentric with the hub 200, formed in an annular plate shape, and has a first opening 502 with a first diameter d1 formed in the center to be coupled to the hub 200, bridges 530 that are spaced apart from each other at equal intervals at the edge of the first annular portion 520 and extend radially outward, and a second annular portion 540 that is concentric with the first annular portion 520, is formed integrally with one ends of the bridges 530 extending radially outward, is fastened to the disk 300, and is formed larger than the first annular portion 520. The vibration preventing portions 510 are concentric with the first opening 502, formed at equal intervals on the first annular portion, and protruded in the axial direction.

In order to prevent the vibration due to resonance generated when the frequency transmitted to the elastic member 500 in response to the operation of the compressor, coincides with the frequency of the elastic member 500 by increasing rigidity, each vibration preventing portion 510 extends from the surface of the elastic member 500 to a first length (b) in a horizontal direction and a second length (a) in a vertical direction. The first length (b) may extend longer than the second length (a).

Each vibration preventing portion 510 extends from the surface of the elastic member 500 to a first length (b) in a horizontal direction and a second length (a) in a vertical direction. The second length (a) may extend longer than the first length (b).

The elastic member 500 has second openings 504 spaced at equal intervals in the circumferential direction between the first annular portion 520 and the second annular portion 540.

The vibration preventing portions 510 are located at an intermediate position of the spaced-apart bridges 530.

The vibration preventing portions 510 are protruded in one of a polygonal shape, a rounded shape, and a triangular shape toward either an outer side or an inner side with respect to a surface thereof.

Assuming that each of the vibration preventing portions 510 has a thickness of T1 and the elastic member 500 has a thickness of T2, the thickness of T1 is thinner than the thickness of T2.

Assuming that each of the vibration preventing portions 510 has a thickness of T1 and an outwardly protruded height of the elastic member 500 is H, the protruded height of H is any one height determined between 1.1T and 2T.

A length of each of the vibration preventing portions 510 extends to a length corresponding to a radial length of the first annular portion 520.

The attenuation members 600 are spaced apart from each other in a radial direction at a position where the bridges 530 and the second annular portion 540 are connected, and do not overlap with the vibration preventing portions 510 in a radial direction.

The elastic member 500 is fastened to the hub 200 by a first fastening member 10 that is coupled to the hub 200 from an outside of the elastic member 500, and a second fastening member 20 that is coupled to the disk 300 along an outermost edge of the elastic member 500. The first and second fastening members 10 and 20 are concentric with the center of the hub 200 and are spaced at equal intervals, and do not overlap each other in the radial direction.

The first fastening member 10 is positioned between the spaced-apart vibration preventing portions 510, and the second fastening member 20 is positioned to face the vibration preventing portions 510 in the radial direction.

The second fastening member 20 is spaced radially outwardly with respect to the first fastening member 10, and positioned between the spaced-apart first fastening members 10.

The clutch according to a second embodiment of the present invention includes a pulley 100 that is axially rotatably coupled to a rotation shaft 3 of a compressor and receives power from an external driving source, a hub 200 that is positioned to face the pulley 100 in an axial direction and rotated together with the rotation shaft 3, a disk 300 that is coupled to the hub 200 and rotated together; a field coil assembly 400 that is positioned inside the pulley 100 and enables the disk 300 to move relative to the pulley 100 by an electromagnetic force generated according to whether or not power is applied, an elastic member 500 that is positioned on an outer surface of the disk 300 and includes a plurality of first vibration preventing portions 510a positioned in a radial direction with respect to a center of the hub 200 and a plurality of second vibration preventing portions 520a positioned along an outer edge, in order to reduce the amplitude of the frequency band where abnormal noise is generated by vibration transmitted when the compressor is operated, and an attenuation member 600 that is interposed between the disk 300 and the elastic member 500.

The elastic member 500 further includes a first annular portion 530a that is concentric with the hub 200, formed in an annular plate shape, has a first opening 502 formed at a center thereof with a first diameter d1 to be coupled to the hub 200, bridges 540a that are spaced apart from each other at equal intervals at an edge of the first annular portion 530a and extend outward in the radial direction, and a second annular portion 550a that is concentric with the first annular portion 530a, is formed integrally with ends of the bridges 540a extending radially outwardly and fastened to the disk 300, and is formed larger than the first annular portion 530a. The first vibration preventing portions 510a are formed on the first annular portion 530a, and the second vibration preventing portions 520a are formed on the second annular portion 550a.

The attenuation members 600 are spaced apart from each other outward in the radial direction at a position where the bridges 540a and the second annular portion 550a are connected, and do not overlap with the first and second vibration preventing portions 510a and 520a in the radial direction.

The elastic member 500 is fastened to the hub 200 by a first fastening member 10 that is coupled to the hub 200 from an outside of the elastic member 500 to be fastened to the hub 200, and a second fastening member 20 that is coupled to the disk 300 along an outermost edge of the elastic member 500. The first and second fastening members 10 and 20 are concentric with the center of the hub 200 and are spaced apart from each other at equal intervals, and do not overlap each other in the radial direction, and the second vibration preventing portions 520a are formed between the attenuation member and 600 the second fastening member 20.

A third embodiment of the present invention provides a compressor including a casing 1, a compression mechanism 2 that is provided inside the casing 1 and compresses a refrigerant, a rotation shaft 3 that transmits a rotational force to the compression mechanism 2 from a driving source provided outside the casing 1, and a power transmission mechanism that selectively connects and separates the driving source and the rotation shaft 3. The power transmission mechanism includes a clutch 4.

The embodiment of the present invention can reduce the amplitude of a high frequency band among vibrations transmitted in an axial direction of a clutch to reduce the occurrence of vibrations due to resonance.

The embodiments of the present invention can provide a compressor that operates with low noise and low vibration by simultaneously reducing the amplitudes of a high frequency band and a low frequency band among vibrations transmitted in an axial direction of a clutch.

The embodiments of the present invention can minimize abnormal vibration and abnormal noise generated from an elastic member by increasing rigidity against vibration transmitted in an axial direction of a clutch.

DESCRIPTION OF EMBODIMENTS

Hereinafter, a clutch and a compressor comprising same according to the present invention will be described in detail with reference to the accompanying drawings.

Figure 1:
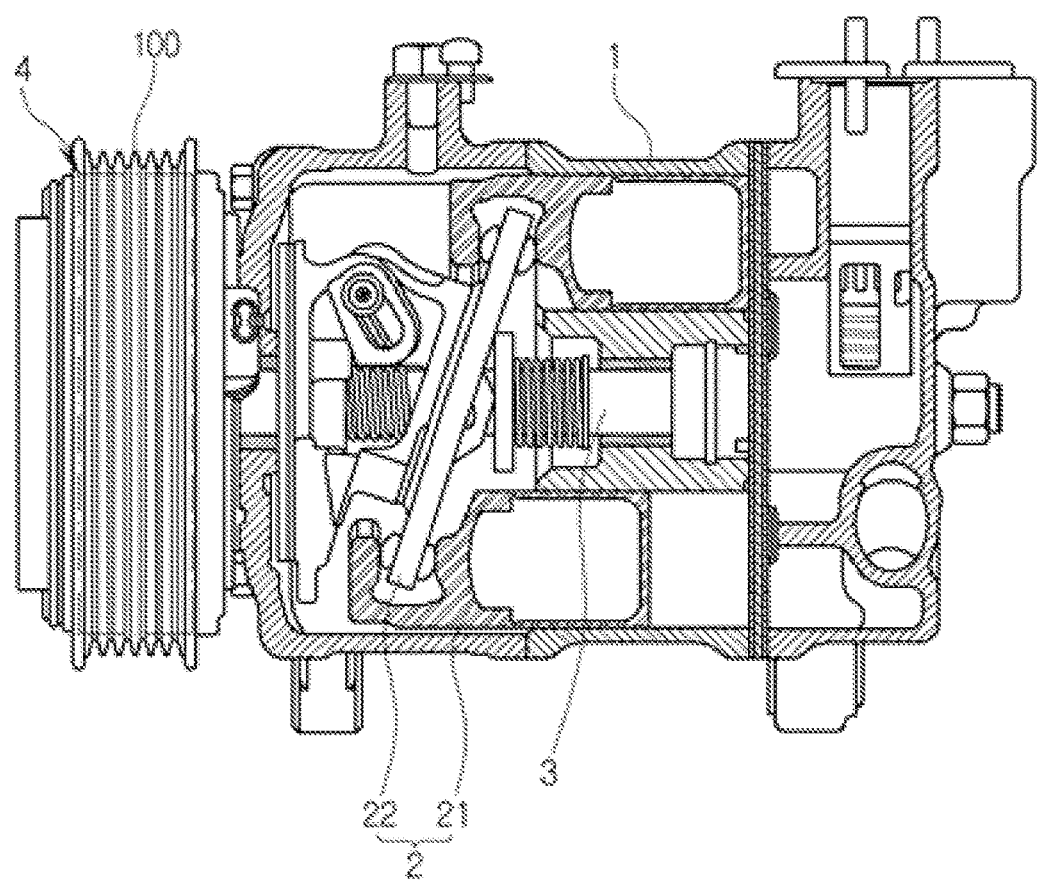
FIG. 1 is a cross-sectional view showing a compressor including a clutch.
Figure 2:
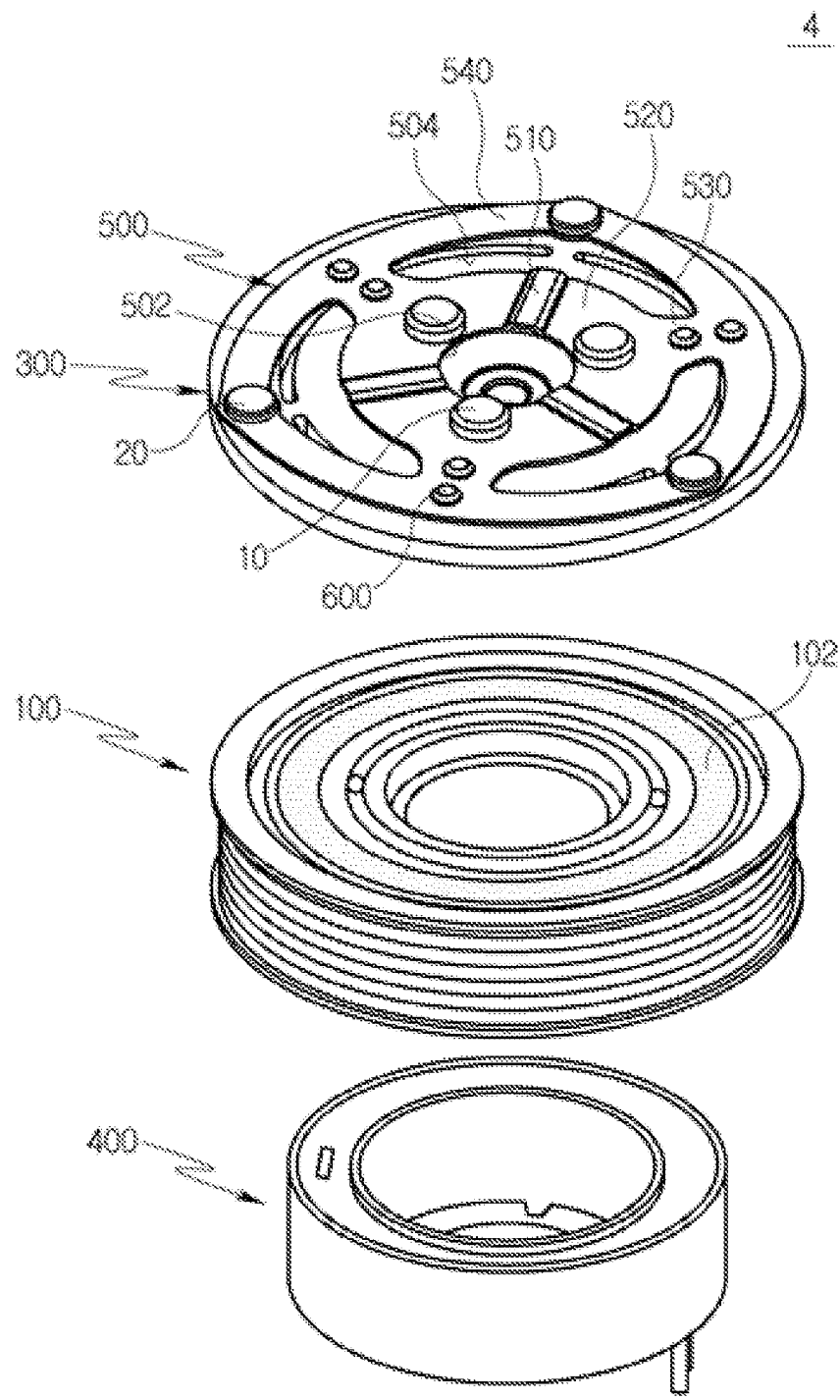
FIG. 2 is an exploded perspective view showing a clutch according to a first embodiment of the present invention.
Figure 3:
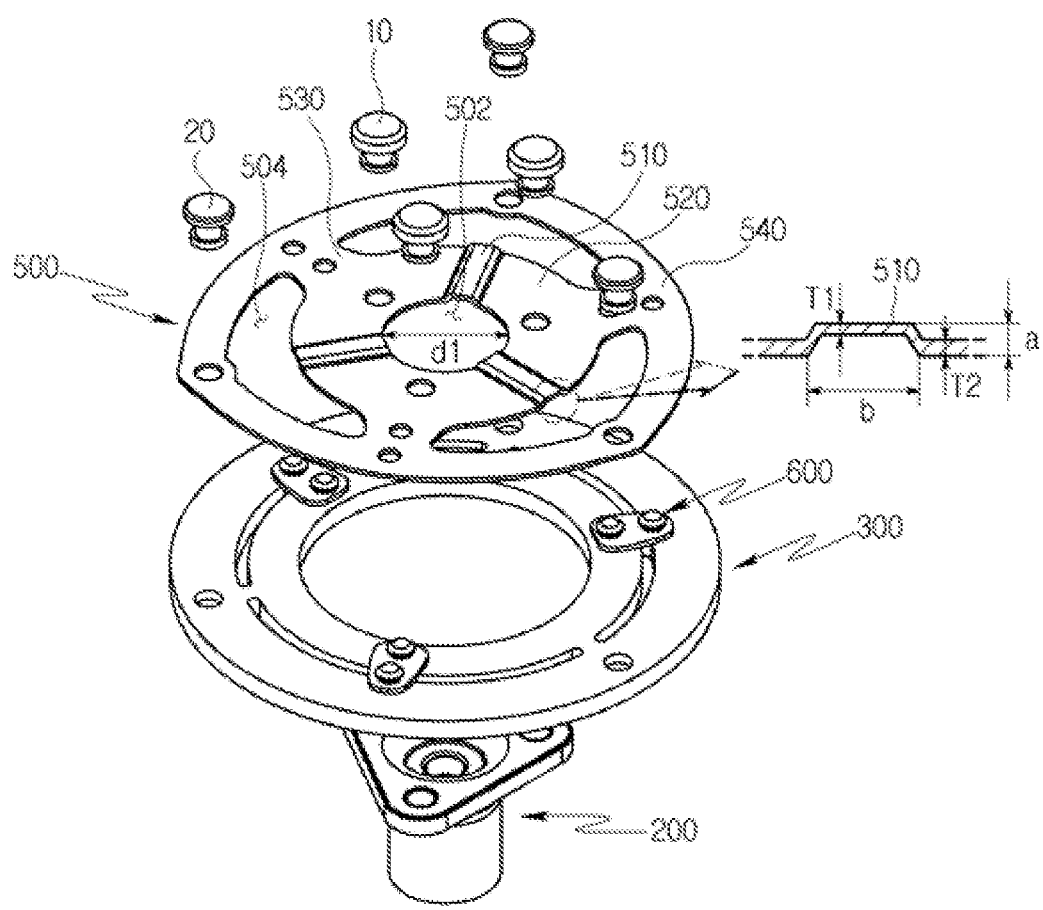
FIG. 3 is an exploded perspective view showing the disk hub assembly of FIG. 2.

FIG. 1 is a cross-sectional view showing a compressor including a clutch, FIG. 2 is an exploded perspective view showing a clutch according to a first embodiment of the present invention, and FIG. 3 is an exploded perspective view showing the disk hub assembly of FIG. 2.

A clutch according to a first embodiment of the present invention will be described with reference to the drawings.

Referring to FIGS. 1 to 3, a clutch according to a first embodiment of the present invention may increase rigidity to minimize the occurrence of vibration. It prevents abnormal vibration generated by an elastic member 500 due to resonance when the self-vibration frequency of the elastic members 500 constituting the clutch coincides with the frequency due to the vibration transmitted in an axial direction of the clutch in response to the operation of a compressor provided in a vehicle.

This embodiment may solve the problem caused by resonance by changing rigidity among two methods of changing rigidity or mass so that the vibration noise due to resonance in the elastic member 500 is minimized.

For reference, the method of changing mass can be performed by changing a material size or by changing into a material with different density, but, the above-described structure for changing the rigidity may be adopted in consideration of the manufacturing const and constraints on the arrangement space in which the compressor is installed.

In this embodiment, in order to minimize the vibrational noise due to resonance in the elastic member, the rigidity may be increased to control a natural frequency, and a more detailed description will be provided when describing the elastic member 500, and the configuration of the compressor and the clutch will be first described.

The present embodiment will be described with a clutch 4 that receives power from a compressor used for compressing a refrigerant in a vehicle, and the clutch 4 is coupled to the left end of the compressor. For reference, in FIG. 1, it will be described that the clutch 4 is located inside the pulley.

In the present invention, among the components constituting the clutch 4, the elastic member 500 to be described later may have a changed rigidity in order to prevent vibrational noise phenomenon due to resonance. It solves the problem of vibrational noise due to resonance when the frequency according to the vibration transmitted in the axial direction coincides with the self-frequency of the elastic member 500.

In addition, the elastic member 500 may change resonance frequency by reinforcing rigidity, and thus, prevent the problem due to resonance.

Thus, in this embodiment, the compressor includes a casing 1 that forms an outer shape, a compression mechanism 2 that is provided inside the casing 1 and compresses a refrigerant, a rotation shaft 3 that transmits a rotational force from a driving source (for example, an engine) provided outside the casing 1 to the compression mechanism 2, and a power transmission mechanism to selectively connect and separate the driving source (not shown) and the rotation shaft 3.

The compression mechanism 2 includes a piston 21 that is provided to reciprocate in an axial direction inside the bore of the casing 1, and a swash plate 22 that is rotated together with the rotation shaft 3 and makes the piston 21 to reciprocate.

The compression mechanism 2 is configured to include the piston 21 and the swash plate 22, and it may be configured in various ways, such as a scrolling way in which an orbiting scroll that is rotated by receiving the rotational force of the rotation shaft 3 and a fixed scroll engaged with the orbiting scroll are included.

The rotation shaft 3 has one end connected to the compression mechanism 2, and the other end extending to the left as shown in the drawing, protruding outward through the casing 1, and connected to a disk hub assembly of the power transmission mechanism, which will be described later.

The power transmission mechanism may be magnetized to connect the driving source (not shown) and the rotation shaft 3 in response to the application of power, and demagnetized to form an electronic clutch (hereinafter, clutch 4) to separate the driving source (not shown) and the rotation shaft 3 in response to the power-off.

The clutch 4 includes a pulley 100 that is axially rotatably coupled to the rotation shaft 3 and receives power from an external driving source, a hub 200 that is positioned to face the pulley 100 in the axial direction and is rotated together with the rotation shaft 3, a disk 300 that is coupled with the hub 200 and rotated together, and a field coil assembly 400 that is positioned inside the pulley 100 and enables the disk 300 to move relative to the pulley 100 by the electromagnetic force generated according to the application of power.

The field coil assembly 400 is magnetized in response to the application of the power to make the disk 300 and the hub 200 in contact with the pulley 100.

The pulley 100 is formed in an annular shape, and a driving belt (not shown) for transmitting a driving force from the driving source (not shown) to the pulley 100 is wound on the outer circumferential surface. A bearing for rotatably supporting the pulley 100 may be interposed between the inner circumferential surface of the pulley 100 and the outer surface of the casing 1.

On one side (a top surface as shown in the drawing) of the pulley 100 a friction surface 102 is formed to be contactable to the disk 300, and a receiving groove (not shown) in which the field coil assembly 400 is inserted is formed on the other side (bottom).

The disk hub assembly includes the hub 200, the disk 300 that is rotated together with the hub 200 and is selectively contacted and spaced apart from the pulley 100, and the elastic member 500 that is positioned on the outer surface of the disk 300 and has a plurality of vibration preventing portions 510 formed in a radial direction based on the center of the hub 200 in order to reduce the amplitude of the frequency band in which abnormal noise is generated due to vibration transmitted when the compressor is operated.

The disk 300 is formed of an annular disk facing and in close contact with the hub 200, and has a hole opened in a predetermined size in the center. Thus, the hub 200 is located in the center.

When the disk 300, the hub 200, and the elastic member 500 are assembled with each other, the hub 200 is located in the center of the inner side of the disk 300, and the elastic member 500 is closely assembled on the upper surface of the disk 300.

The elastic member 500 supports the disk 300 so as to be movable in a direction closer to or away from the pulley 100 based on the hub 200 coupled with the rotation shaft 3 and fixed in position.

The elastic member 500 is formed in order to apply an elastic force in a direction in which the disk 300 is away from the pulley 100 so that the disk 300 and the pulley 100 is separated when the power to the field coil assembly 400 is cut off.

In addition, the present embodiment includes an attenuation member 600 interposed between the disk 300 and the elastic member 500 to attenuate noise and vibration.

When the pulley 100 and the disk 300 are in contact with each other, the noise and vibration due to collision are generated, and the noise and vibration due to the collision can be transmitted to the compressor through the disk 300, the elastic member 500, and the hub 200.

In addition, when the disk 300 is in contact with the pulley 100 and then separated from the pulley 100, the noise and vibration due to collision between the disk 300 and the elastic member 500 may be generated. The noise and vibration caused by the contact and separation between the disk 300 and the pulley 100 may cause discomfort to a user and may affect the operation of the compressor.

This embodiment tested and confirmed the above-described noise and the amplitude generated in various frequency band ranges transmitted from the compressor in the axial direction of the hub 200, the disk 300, and the elastic member 500. By preventing the occurrence of a resonance phenomenon in a specific frequency band during the vibration of the elastic member 500, the rigidity of the elastic member 500 can be secured and noise generation can be minimized.

For reference, the frequency band generated by the vibration of the elastic member 500 will be described later, and the structural will be first described.

The elastic member 500 includes a first annular portion 520 that is concentric with the hub 200, is formed in an annular plate shape, and has a first opening 502 with a first diameter d1 formed in the center to be coupled to the hub 200, bridges 530 that are spaced apart from each other at equal intervals at the edge of the first annular portion 520 and extend radially outward, and a second annular portion 540 that is concentric with the first annular portion 520, is formed integrally with ends of the bridges 530 extending radially outward, is fastened to the disk 300, and is formed larger than the first annular portion 520.

Both the first annular portion 520 and the second annular portion 540 are formed in a disk shape and are connected to each other through the bridges 530.

In this embodiment, since the first annular portion 520 is provided to minimize the vibration transmitted through the hub 200 coupled to the rotation shaft 3, the vibration transmitted through the rotation shaft 3 and the hub 200 when the compressor is operated can be attenuated, thereby preventing vibration.

Since the first annular portion 520 has a diameter larger than that of the disk 300 so that moisture does not penetrate into the disk 300, it is prevented that moisture or humidity enters or penetrates into the disk 300.

The elastic member 500 is formed with second openings 504 that are spaced apart at equal intervals in the circumferential direction between the first annular portion 520 and the second annular portion 540.

The second openings 504 are concentric with the first opening 502, spaced apart from each other at equal intervals, and opened as slots in the longitudinal direction.

The vibration preventing portions 510 are concentric with the first opening 502 and protrude in the axial direction (an upper side of the disk as shown in the drawing) at equal intervals.

In particular, the vibration preventing portions 510 protrude in the axial direction of the elastic member 500 as shown in the drawing.

For example, the vibration preventing portions 510 according to the present embodiment increase the rigidity of the elastic member 500. It is provided in order to prevent the vibration due to the resonance generated when the frequency of the elastic member 500 and the frequency transmitted to the elastic member 500 in response to the operation of the compressor coincide with each other.

The elastic member 500 may attach a separate member such as a rib to a surface so as to increase rigidity. But, in consideration of the arrangement relationship with neighboring components such as the disk 300 or the hub 200 and the minimizing of the increase in volume of the clutch 4, the vibration preventing portions 510 are formed to change the natural frequency of the elastic member 500 so that the resonance phenomenon due to the vibration transmitted in the axial direction can be minimized.

The present embodiment, rather than attaching a separate member to the first annular portion 520, forms the vibration preventing portions 510 protruding outward by a press processing. Thus, among the vibrations according to various frequency bands transmitted in the axial direction of the elastic member 500, the amplitude of the high frequency band is reduced to minimize the problem caused by resonance.

The length of each vibration preventing portion 510 is extended to correspond to the radial length of the first annular portion 520. The vibration preventing portions 510 are formed in the radial direction of the first annular portion 520 in order to reduce the amplitude of the high frequency noise among the vibrations generated by the elastic member 500 to a maximum. Thus, the elastic member 500 minimizes the vibration noise due to vibration in the high frequency band.

Figure 4:
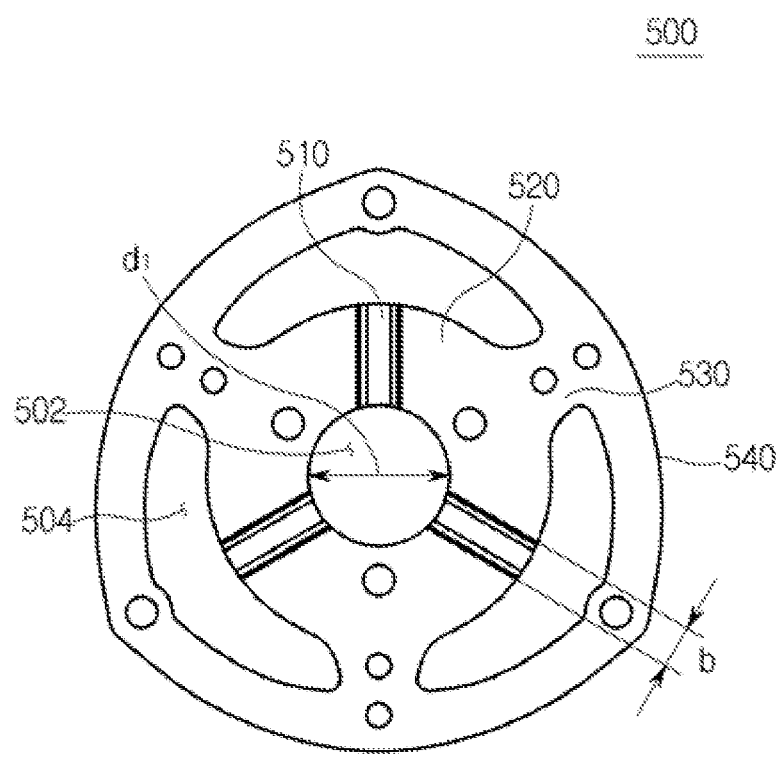
FIG. 4 is a plan view showing an elastic member according to a first embodiment of the present invention.

Referring to FIGS. 3 to 4, each vibration preventing portion 510 extends from the surface of the elastic member 500 to a first length (b) in a horizontal direction and a second length (a) in a vertical direction in order to reduce the vibration in the axial direction of the elastic member according to the embodiment and to reduce vibration noise due to resonance. In particular, the first length (b) extends longer than the second length (a).

The elastic member 500 is formed in an annular plate shape constituted with a first annular portion 520 and a second annular portion 540, and bending occurs when vibration is transmitted in the axial direction.

The vibration preventing portions 510 reinforce the rigidity against the bending generated in the axial direction of the elastic member 500. The first length (b) is extended longer than the second length (a) in order to increase rigidity so that the vibration frequency transmitted in the axial direction and the natural frequency of the elastic member 500 do not match.

The second moment of inertia (I) of the elastic member 500 is calculated by the following calculation formula.

$$I(\text{second moment of inertia}) = ba^3/12$$

Here, b is defined as a horizontal length and a is defined as a vertical length, and since the second moment of inertia increases as b and a increase, the rigidity reinforcement can be advantageously adjusted by adjusting b and a.

In this embodiment, the second moment of inertia of the elastic member 500 is increased by adjusting the value b instead of the value a. By adjusting the natural frequency, the vibration of the elastic member 500 in the axial direction is prevented.

Assuming that the thickness of each vibration preventing portion 510 is T1 and the thickness of the elastic member 500 is T2, the thickness T1 is thinner than the thickness T2. T1 of the vibration preventing portion 510 is formed to be thinner than T2 for convenience of molding.

Assuming that the thickness of each vibration preventing portion 510 is T1 and the height of the elastic member 500 protruding outward is H, H is a protruded height determined between 1.1T and 2T.

The height H corresponds to the above-described second length (a), and the maximum height H is formed within 2T.

The attenuation members 600 are spaced apart from each other in a radial direction at a location where the bridges 530 and the second annular portions 540 are connected, and do not overlap with the vibration preventing portions 510 in a radial direction.

The arrangement above is made in consideration of the stable installation of the elastic member 500, the natural frequency, and the vibration transmitted in the axial direction.

The vibration preventing portions 510 are located at an intermediate position of the spaced-apart bridges 530.

For example, the bridges 530 are spaced apart from each other at equal intervals based on the plan view of the elastic member 500 and are formed in all three locations. In this case, the arrangement for being spaced with intervals of 120 degrees is maintained.

Since the vibration preventing portions 510 are located at an intermediate position of the spaced-apart bridges 530, they can be in better state than the vibration and rigidity generated in an axial or radial direction.

Each vibration preventing portion 510 has a width W of any one selected from 5% to 20% of the circumferential length corresponding to the first diameter (d1). For reference, the width W corresponds to the first length (b).

The width W is formed to have a length set in the above-described range in consideration of the natural frequency of the elastic member 500 and the frequency at which resonance occurs.

Figure 5:
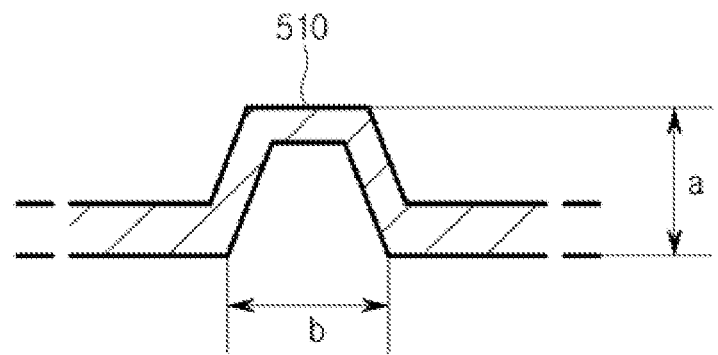
FIGS. 5 to 8 are diagrams showing various embodiments of a vibration preventing portion according to a first embodiment of the present invention.

Referring to FIG. 5, the vibration preventing portions 510 according to another embodiment extend from the surface of the first annular portion 520 to a first length (b) in a horizontal direction, and a second length (a) in a vertical direction. The second length (a) is extended longer than the first length (b).

In this embodiment, unlike the above-described embodiment, the second length (a) is extended longer than the first length (b), thereby increasing the second moment of inertia of the vibration preventing portions 510 to reinforce rigidity. Accordingly, the occurrence of vibration due to resonance may be minimized by changing the natural frequency of the elastic member 500.

Figure 6:
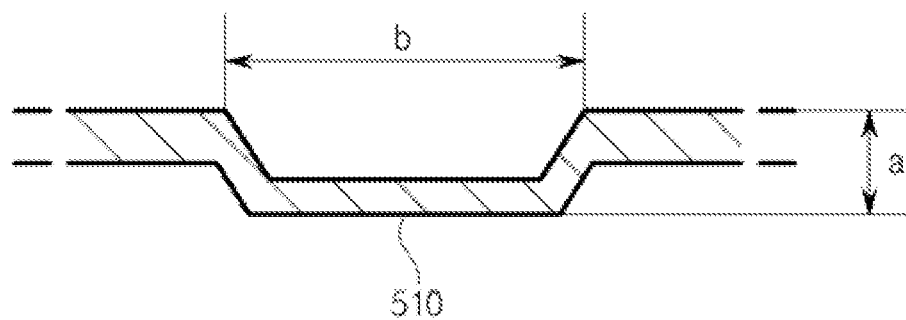
Figure 7:
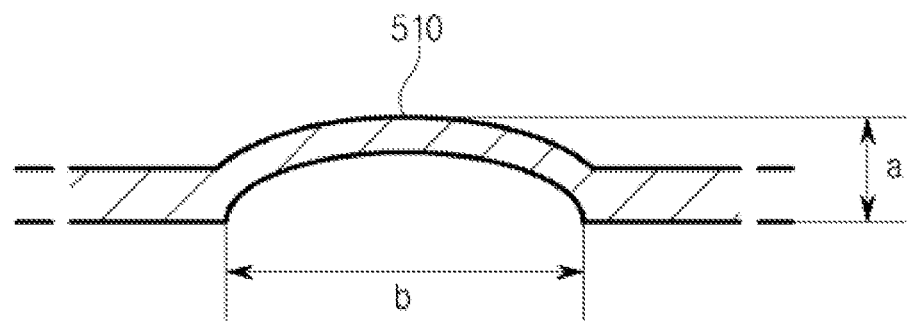
Figure 8:
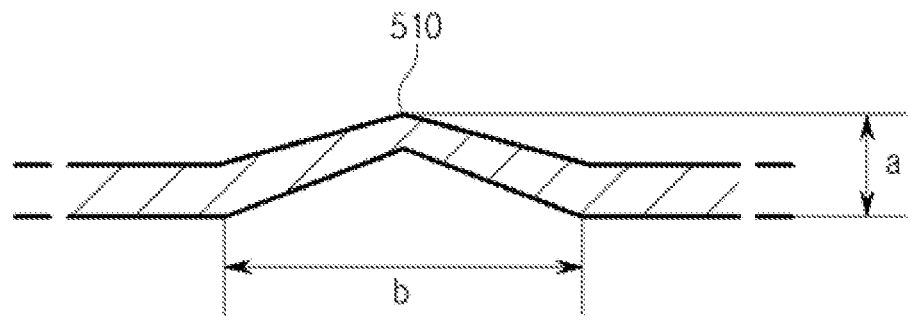

Referring to FIGS. 6 to 8, the vibration preventing portions 510 according to the present embodiment can be protruded in one of a polygonal shape, a rounded shape, or a triangular shape toward either an outer side or an inner side with respect to a surface thereof.

In this embodiment, various shapes of the vibration preventing portions 510 are illustrated, and various shapes other than the shape illustrated in the drawing can be implemented in order to reinforce the rigidity and to change the natural frequency of the elastic member 500.

Since the attenuation members 600 do not overlap with the vibration preventing portions 510, they are spaced apart from each other at equal intervals in the circumferential direction of the second annular portion 540 to maintain a stable coupling with the disk 300.

The attenuation members 600 are formed of rubber, but may be formed of a different material. It reduces the impact generated when the disk 300 and the pulley 100 are spaced apart or in contact with each other in order to reduce vibration and noise generation. Thus, noise generation is minimized.

Since the attenuation members 600 are spaced apart from each other at equal intervals at positions where they do not overlap with the vibration preventing portions 510, the generation of vibration and noise in the axial direction is minimized.

The elastic member 500 is fastened to the hub 200 by a first fastening member 10 coupled to the hub 200 from the outside of the elastic member 500, and a second fastening member 20 coupled to the disk 300 along the outermost edge of the elastic member 500.

Further, the first and second fastening members 10 and 20 are concentric with the center of the hub 200 and are spaced from each other at equal intervals, and do not overlap with each other in a radial direction.

When power is applied to the field coil assembly 400, and then, the disk 300 and the pulley 100 contact each other, the first and second fastening members 10 and 20 contact the disk 300, thereby absorbing the noise and vibration transmitted from the pulley 100 to the elastic member 500 through the disk 300.

In addition, when the power applied to the field coil assembly is cut off, and then, the disk 300 is spaced apart from the pulley 100, the first and second fastening members 10 and 20 contact the disk 300, thereby preventing a collision between the disk 300 and the elastic member 500.

The above-described attenuation members 600 may further reduce noise and vibration caused by the collision between the disk 300 and the pulley 100 when the disk 300 and the pulley 100 contact or are separated.

The first fastening member 10 is positioned between the spaced-apart vibration preventing portions 510, and the second fastening member 20 is positioned to face the vibration preventing portions 510 in a radial direction. The above-described position where the second fastening member 20 is located is the optimum coupling position for reducing the vibration generated in the radial direction of the first annular portion 520 and the second annular portion 540 and in the circumferential direction of the second annular portion 540.

The second fastening member 20 is spaced radially outward with respect to the first fastening member 10, and positioned between the spaced-apart first fastening members 10.

The position may be an optimal position in the case that the second fastening members 20 are arranged to be spaced apart at equal intervals, in consideration of a spaced distance with respect to the spaced-apart attenuation members 600 in the circumferential direction.

Since the second fastening member 20 is spaced apart from the attenuation member 600 at equal intervals, it is possible to stably maintain a coupled state with the disk 300 in the circumferential direction of the second annular portion 540.

The attenuation member 600 is formed of any one of acrylonitrile-butadiene rubber (NBR), isobutylene-isoprene rubber (IIR), ethylene propylene diene monomer rubber (EPDM), thermoplastic plastic, and thermosetting plastic, for example, but the material of the attenuation member 600 may be changed according to the capacity of the compressor.

Meanwhile, in the present embodiment, the first and second fastening members 10 and 20 are formed of, for example, stainless steel (SUS) or steel, but the material may be changed.

Figure 9:
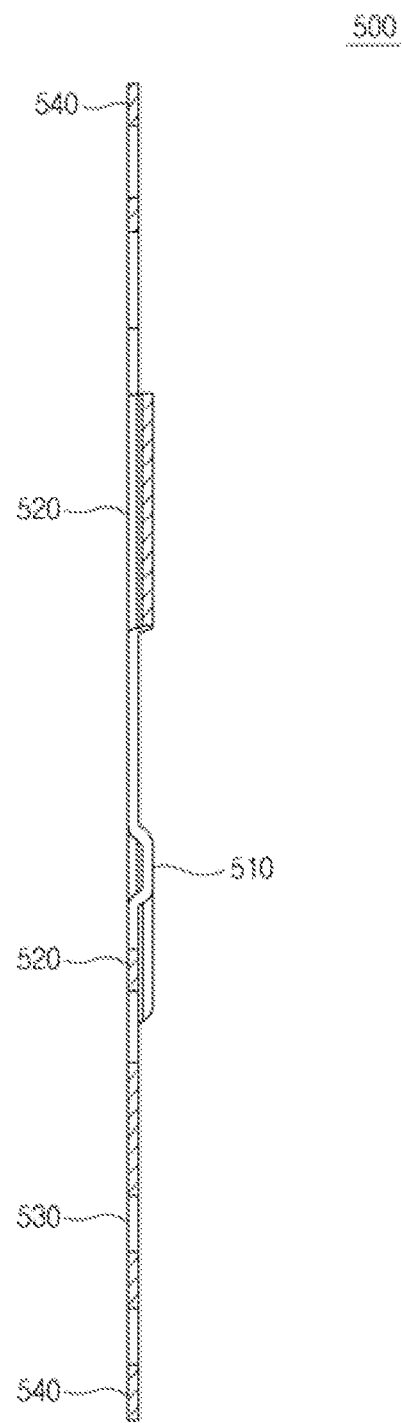
FIG. 9 is a longitudinal cross-sectional view of an elastic member according to a first embodiment of the present invention.

Referring to FIG. 9, when viewed from the side in a longitudinal cross-sectional view of the elastic member 500 according to the present embodiment, the above-described vibration preventing portions 510 protrude upward (a right side as shown in the drawing).

When the axial vibration transmitted from the left to the right of the drawing is applied, the vibration preventing portions 510 reduce the amplitude to a maximum, thereby minimizing vibration noise due to the vibration of the elastic member 500 in a high frequency band.

The vibration preventing portions 510 reduce vibration in the axial direction, and reduce vibration in the radial direction through the adjacently disposed first annular portion 520 and second annular portion 540, thereby minimizing the generation of vibration due to resonance.

Figure 10:
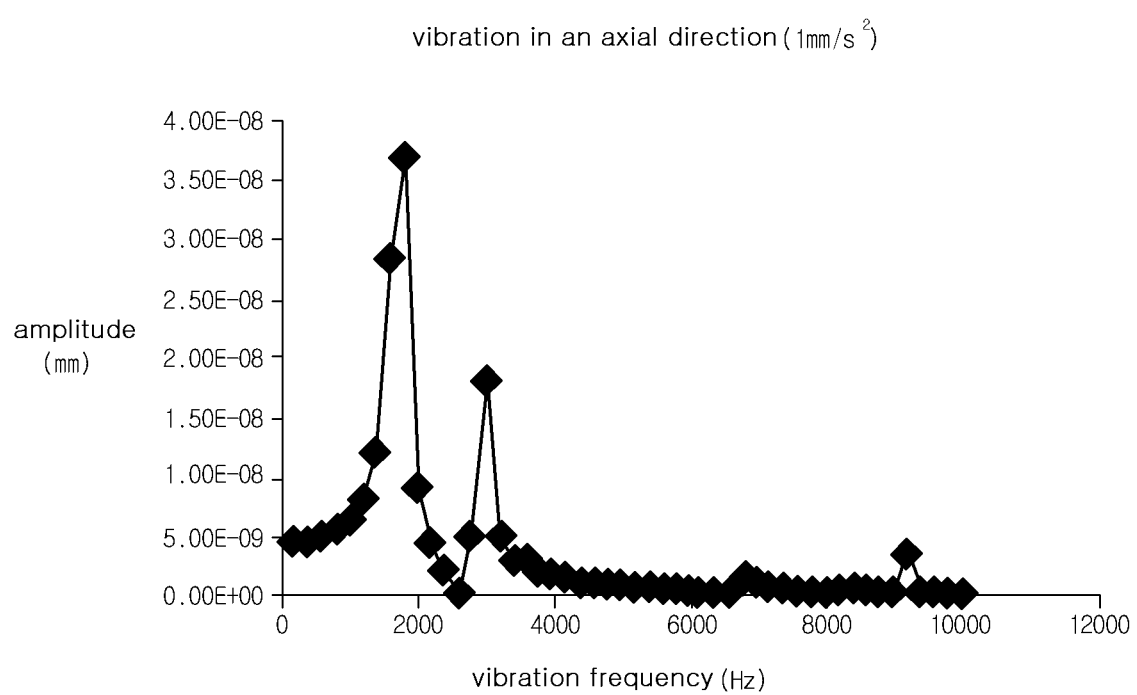
FIG. 10 is a diagram showing the axial vibration generated in a disk hub assembly provided in a conventional clutch.
Figure 11:
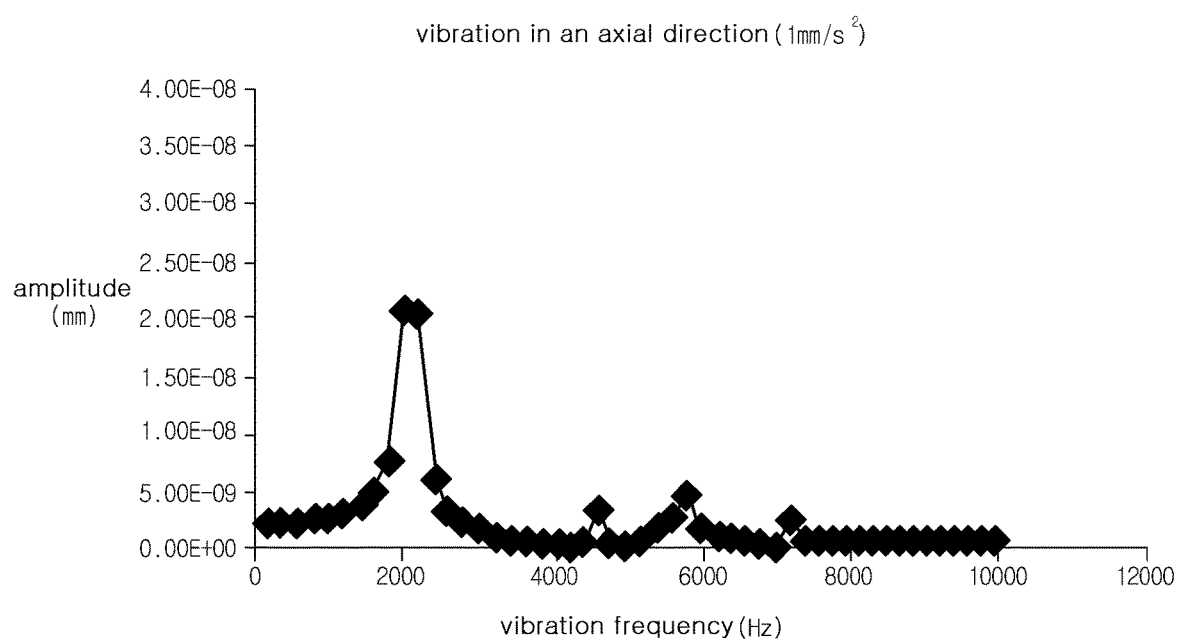
FIG. 11 is a diagram showing the axial vibration generated in a disk hub assembly according to the present embodiment.

FIG. 10 is a diagram illustrating axial vibration generated in a disk hub assembly provided in a conventional clutch, and FIG. 11 is a diagram illustrating axial vibration generated in a disk hub assembly according to the present embodiment. For reference, an X-axis shows a vibration frequency and a Y-axis shows an amplitude.

Referring to the accompanying FIGS. 10 to 11, it can be seen that when vibration is transmitted in the axial direction of the conventional disk hub assembly, resonance occurs in the 2 KHz band and the 3 KHz-5 KHz band, and a high frequency amplitude increases rapidly.

The resonance occurs in the frequency band because the vibration frequency transmitted to the elastic member 500 and the natural frequency of the elastic member 500 coincide with each other. In this embodiment, the natural frequency of the elastic member 500 is changed by the vibration preventing portions 510 so that the noise generation due to resonance can be minimized.

In this embodiment, it can be seen that a high frequency amplitude is rapidly reduced in 2 KHz band and 3 KHz 5 KHz band, and the vibration due to resonance in the elastic member 500 is significantly reduced.

Accordingly, it can be seen that the elastic member 500 according to the present embodiment simultaneously reduces vibration noise while reducing the resonance phenomenon in the high frequency band by the vibration preventing portions 510.

A second embodiment of the present invention will be described with reference to the drawings.

Figure 12:
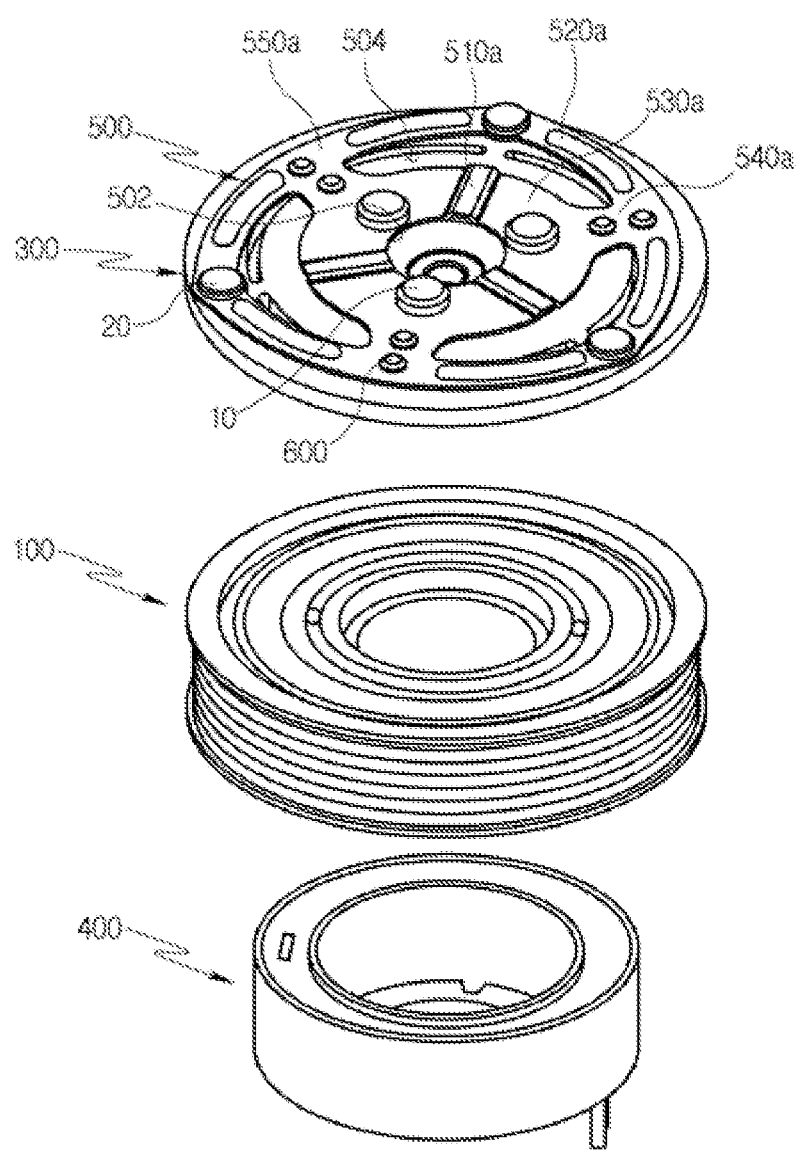
FIG. 12 is an exploded perspective view showing a clutch according to a second embodiment of the present invention.
Figure 13:
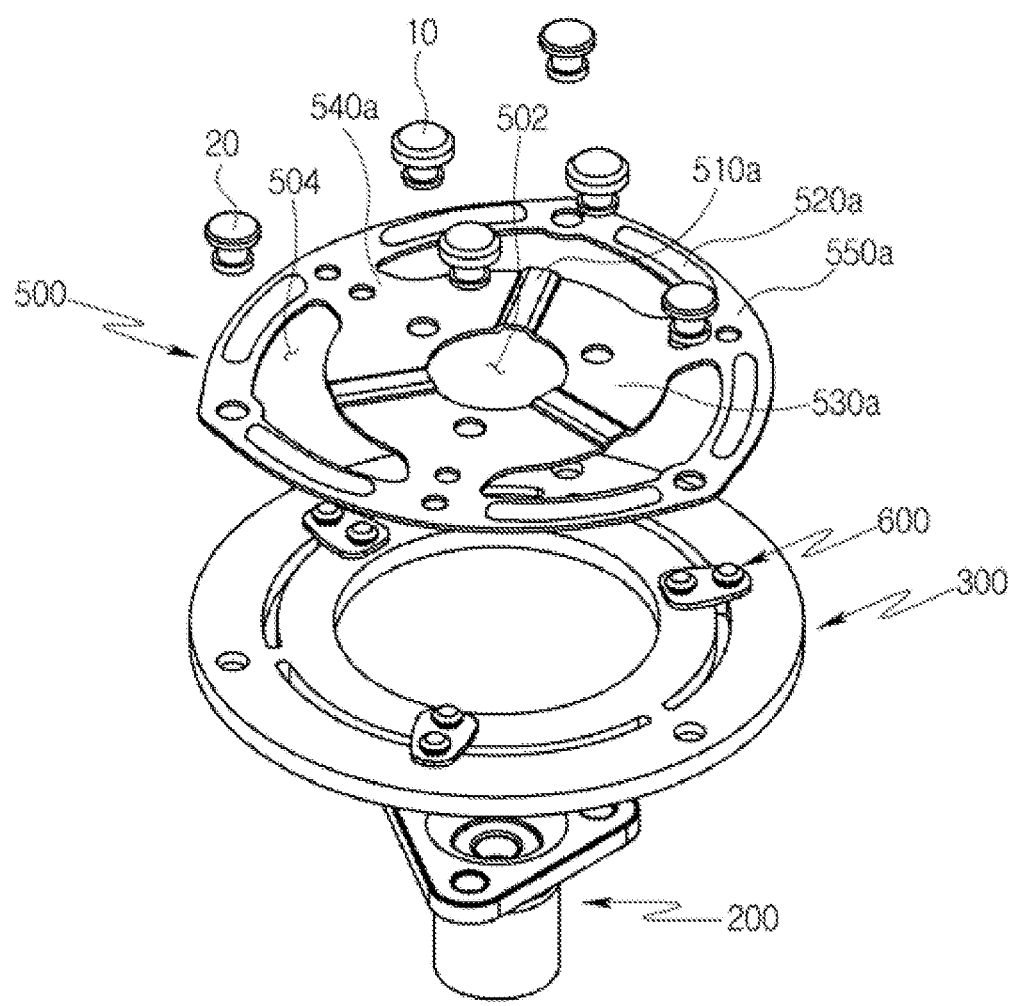
FIG. 13 is an exploded perspective view showing the disk hub assembly of FIG. 12.

Referring to FIGS. 12 to 13, the elastic member 500 according to this embodiment includes first and second vibration preventing portions 510a and 520a to be described later, unlike the elastic member according to the first embodiment described above. The first vibration preventing portion 510a reduces a part corresponding to a high frequency amplitude among the vibrations transmitted in the axial direction of the elastic member 500, and the second vibration preventing portion 520a reduces a part corresponding to a low frequency amplitude of the vibrations generated in the elastic member 500. Thus, it is possible to minimize the occurrence of noise and vibration due to resonance.

That is, in the second embodiment of the present invention, the elastic member 500 may reduce the high frequency amplitude and the low frequency amplitude at the same time, and thus, reduce the amplitude of a specific frequency band among the vibrations transmitted in the axial direction.

The clutch according to the second embodiment of the present invention reduces sudden vibrational noise due to resonance when the frequency of the vibration transmitted in the axial direction of the clutch in response to the operation of the compressor installed in a vehicle coincides with the self-vibration frequency of the elastic member 500 constituting the clutch.

This embodiment may solve the problem caused by resonance by changing rigidity among two methods of changing rigidity or mass so that the vibrational noise due to resonance in the elastic member 500 is minimized.

The present embodiment will be described with the clutch 4 (see FIG. 1) that receives power from a compressor used for compressing a refrigerant in a vehicle, and the clutch 4 is coupled to the left end of the compressor.

The elastic member 500 changes the rigidity of the elastic member 500 in order to solve the vibrational noise problem caused by resonance when the frequency according to the vibration transmitted in the axial direction and the natural frequency of the elastic member 500 coincide each other. Thus, the vibrational noise due to resonance is prevented.

In addition, the elastic member 500 may reinforce rigidity to change resonance frequency so that the problems due to resonance can be prevented.

Thus, the present embodiment provides the pulley 100 that is axially rotatably coupled to the rotation shaft 3 of a compressor and receives power from an external driving source, the hub 200 that is positioned to face the pulley 100 in an axial direction and rotates together with the rotation shaft 3, and the disk 300 that is coupled and rotated together with the hub 200.

In addition, the embodiment provides the field coil assembly 400 that is located inside the pulley 100 and enables the disk 300 to move relative to the pulley 100 by the electromagnetic force generated according to the application of power or not, the elastic member 500 having a plurality of the first vibration preventing portions 510a that are located on the outer surface of the disk 300 and are arranged in a radial direction with respect to the center of the hub 200 in order to reduce the amplitude of the frequency band where abnormal noise is generated due to vibration transmitted when the compressor is operated, and a plurality of the second vibration preventing portions 520a that is positioned along an outer edge, and the attenuation member 600 interposed between the disk 300 and the elastic member 500.

The disk 300 is formed of an annular disk facing and in close contact with the hub 200, and has a hole opened in a predetermined size in the center. Thus, the hub 200 is located in the center.

When the disk 300, the hub 200, and the elastic member 500 are assembled with each other, the hub 200 is located in the inner center of the disk 300 and the elastic member 500 is closely assembled on the top of the disk 300.

The elastic member 500 supports the disk so as to be movable in a direction closer to or away from the pulley 100 based on the hub 200 coupled with the rotation shaft 3 and fixed in position.

The elastic member 500 includes a first annular portions 530a that is concentric with the hub 200, is formed in an annular plate shape, has a first opening 502 with a first diameter d1 in the center and being coupled to the hub 200, bridges 540a that are spaced apart from each other at the edge of the first annular portions 530a and extend radially outward, and a second annular portion 550a that is concentric with the first annular portions 530a, is formed integrally with the extended ends of the bridges 540a, fastened to the disk 300, and is formed larger than the first annular portions 530a.

In addition, the first vibration preventing portions 510a are formed in the radial direction of the first annular portions 530a, and the second vibration preventing portions 520a are formed in the circumferential direction of the second annular portion 550a.

Both the first annular portion 530a and the second annular portion 550a are formed in a disk shape, and are connected to each other via the bridges 540a.

Since the first annular portion 530a has a diameter larger than that of the disk 300 so that moisture does not penetrate into the disk 300, a phenomenon in which moisture or humidity enters or penetrates the disk 300 does not occur.

The elastic member 500 has second openings 504 spaced at equal intervals in the circumferential direction between the first annular portion 530a and the second annular portion 550a.

The second openings 504 are concentric with the first openings 502 and spaced apart from each other at equal intervals, and are opened as slots in a longitudinal direction.

In this embodiment, since the first annular portion 530a is provided to minimize the vibration transmitted via the hub 200 connected to the rotation shaft 3, the vibration transmitted through the rotation shaft 3 and the hub 200 in response to the operation of the compressor can be attenuated to prevent vibration.

The first vibration preventing portions 510a are concentric with the first opening 502 and protrude at the same interval while facing an outside (outside of the disk as shown in the drawing).

In particular, the first vibration preventing portions 510a protrude outward of the elastic member 500 as shown in the drawing.

For example, the first vibration preventing portions 510a according to the present embodiment are provided to increase the rigidity of the elastic member 500, and thus, to prevent the vibration due to resonance generated when the frequency of the elastic member 500 and the frequency transmitted to the elastic member 500 in response to the operation of the compressor coincide each other.

The first vibration preventing portions 510a are provided to reduce the amplitude of the high frequency of the elastic member 500, and the second vibration preventing portions 520a are provided to reduce the amplitude of the low frequency of the elastic member 500.

Since the first vibration preventing portions 510a have configurations similar to the configuration described with respect to the above-described first embodiment, a detailed description will be omitted.

Figure 14:
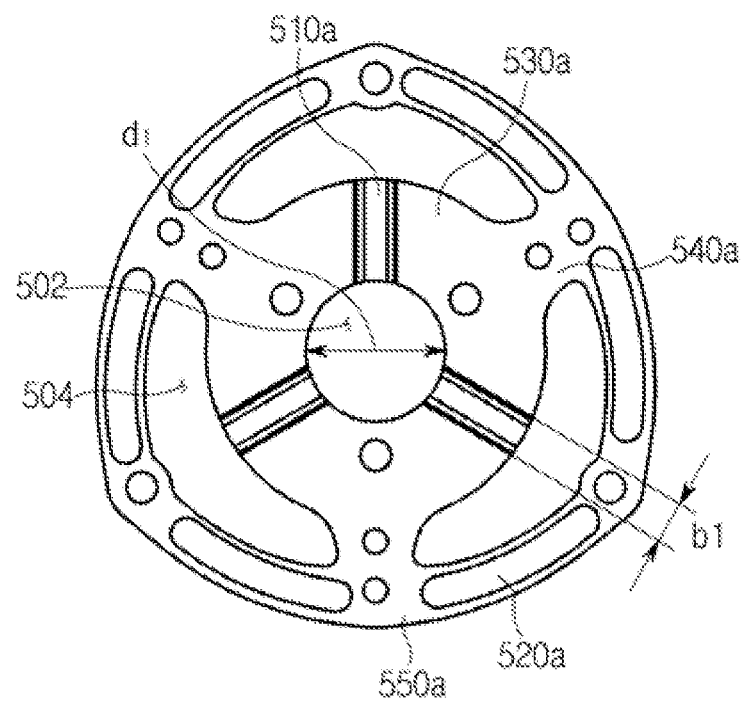
FIG. 14 is a plan view showing an elastic member according to a first embodiment of the present invention.
Figure 15:
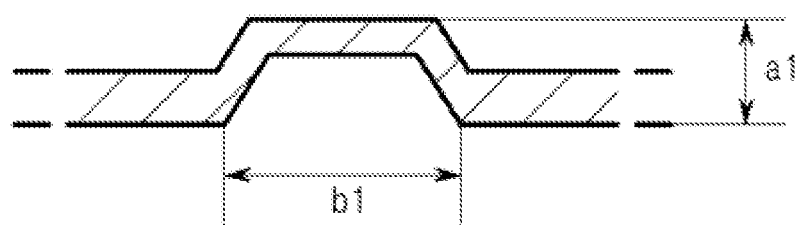
FIG. 15 is a diagram showing an embodiment of first and second vibration preventing portions according to a second embodiment of the present invention.
Figure 15:
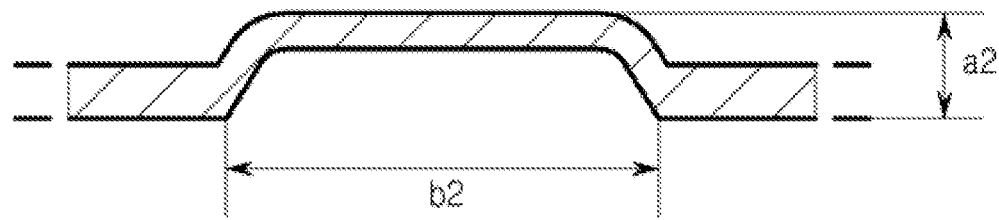

Referring to FIG. 12 or 14 to 15, each first vibration preventing portion 510a extends to a first length (b1) from the surface of the elastic member 500 in a horizontal direction, and to a second length (a1) in a vertical direction. The first length (b1) is extended longer than the second length (a1).

Such extension is to reinforce the rigidity against the bending generated in the axial direction of the elastic member 500. Thus, in order to increase the rigidity so that the vibration frequency transmitted in the axial direction and the natural frequency of the elastic member 500 do not coincide, the first length (b1) extends longer than the second length (a1). For reference, the second moment for inertia (I) of the elastic member 500 is calculated by the following calculation formula.

$$I(\text{Second Moment of inertia}) = ba1^3/12$$

Here, b is defined as a horizontal length, and a1 is defined as a vertical length. Since the second moment of inertia increases as b and a1 increase, the rigidity reinforcement can be advantageously adjusted by adjusting b and a1.

In the present embodiment, the value of b1 is adjusted instead of the value of a1 to increase the second moment of inertia of the elastic member 500 so that the natural frequency is adjusted. Thus, the vibration due to resonance is prevented.

The second vibration preventing portions 520a are provided together with the first vibration preventing portions 510a to minimize a resonance phenomenon caused by the vibration transmitted in the axial direction of the elastic member 500.

In particular, each second vibration preventing portion 520a extends to a third length (b2) in the horizontal direction and to a fourth length (a2) in the vertical direction from the surface of the elastic member 500, in consideration of the fastening state with respect to the disk 300 and the elastic member 500 and the layout of neighboring components at the same time. The third length (b2) is longer than the fourth length (a2). In addition, the third length (b2) extends longer than the first length (b1).

Since the third length (b2) of the second vibration preventing portions 520a extends longer than the first length (b1), the generation of the vibrational noise of the elastic member 500 due to resonance is minimized by changing a specific frequency band of the low frequency band where resonance occurs.

Since a plurality of the second vibration preventing portions 520a is formed at equal intervals at some positions in the circumferential direction of the second annular portions 550a, they can increase the moment of inertia according to the bending generated in the axial direction together with the first vibration preventing portions 510a, so that bending stress can be minimized.

The third length (b2) of the second vibration preventing portions 520a extend sufficiently long due to the shape of the second annular portions 550a as shown in the drawing, so that the rigidity reinforcement is minimally affected even in the case that the outwardly protruded height is lower than the first vibration preventing portions 510a.

Since the second vibration preventing portions 520a are constructed in the way as described above, the layout unfavorable for reinforcing the rigidity can be eliminated by increasing the fourth length (a2) in the case that the elastic member 500 coupled to the disk 300 is operated to be spaced apart from each other at a predetermined distance or is in contact with each other.

The attenuation members 600 are spaced apart from each other outward in a radial direction at a position where the bridges 540a and the second annular portions 550a are connected, and do not overlap with the first and second vibration preventing portions 510a, 520a in the radial direction.

In this case, the vibration due to resonance can be prevented by optimally reducing the amplitude of vibrations generated in the radial and circumferential directions of the first annular portions 530a and the second annular portions 550a.

The elastic member 500 is fastened to the hub 200 by the first fastening member 10 coupled to the hub 200 from the outside of the elastic member 500m and is fastened to the disk by the second fastening member 20 coupled to the disk 300 along the outermost edge of the elastic member 500.

The first fastening member 10 is positioned between the spaced-apart first vibration preventing portions 510a, and the second fastening member 20 is positioned to face the first vibration preventing portions 510a in a radial direction. The above-described position of the second fastening member 20 is to be the optimal coupling position for reducing the vibration generated in the radial direction of the first and second annular portions 530a and 550a and in the circumferential direction of the second annular portion 550a.

The second fastening member 20 is spaced radially outward with respect to the first fastening member 10, and is positioned between the spaced-apart first fastening members 10.

The position may be an optimal position in the case that the second fastening members 20 are arranged to be spaced at equal intervals, in consideration of a spaced distance with respect to the spaced-apart attenuation members 600 in the circumferential direction.

Since the second fastening members 20 are spaced apart from the attenuation members 600 at equal intervals, it is possible to stably maintain a coupled state with the disk 300 in the circumferential direction of the second annular portion 550a.

The first and second fastening members 10 and 20 are concentric with the center of the hub 200 and are spaced at equal intervals, and do not overlap each other in a radial direction. The second vibration preventing portion 520a is formed between the attenuation member 600 and the second fastening member 20.

Since the second vibration preventing portion 520a is located between the attenuation member 600 and the second fastening member 20, it is possible to minimize the generation of vibration and noise in the radial or circumferential direction of the elastic member 500.

The present embodiment includes the casing 1 that forms an outer shape, the compression mechanism 2 that is provided inside the casing 1 and compresses a refrigerant, and the rotation shaft 3 that transmits a rotational force from the driving source (e.g., an engine) provided outside the casing 1 to the compression mechanism 2, and the power transmission mechanism that selectively connects and separates the rotation shaft 3 and the driving source (not shown). The power transmission mechanism is configured to include the compressor having the clutch 4 described above.

The compressor can reduce the amplitude due to vibration transmitted in an axial direction at a maximum when the clutch 4 is combined in the above-described configuration, thereby improving the amplitude reduction effect.

As described above, one embodiment of the present invention has been described, but those of ordinary skill in the relevant technical field can make various modification and change to the present invention by adding, changing, deleting, or adding components within the scope not departing from the spirit of the present invention described in the claims, and it will be said that this is also included within the scope of the present invention.

The present embodiments improve safety by enabling clutch to operate with low transmission and low vibration.

The invention claimed is:

1. A clutch comprising:
    a pulley axially rotatably coupled to a rotation shaft of a compressor and receiving power from an external driving source;
    a hub positioned to face the pulley in an axial direction and rotated together with the rotation shaft;
    a disk coupled to the hub and rotated together with the hub;
    a field coil assembly positioned inside the pulley and enabling the disk to move relative to the pulley by an electromagnetic force generated according to whether or not power is applied;
    an elastic member positioned on an outer surface of the disk and including a plurality of vibration preventing portions formed in a radial direction with respect to a center of the hub; and
    an attenuation member interposed between the disk and the elastic member,
    wherein the elastic member further includes:
        a first annular portion that has a first opening formed at a center thereof and is coupled to the hub;
        bridges spaced apart from each other at equal intervals at an edge of the first annular portion and extending outward in the radial direction; and
        a second annular portion concentric with the first annular portion, formed integrally with ends of the bridges extending radially outwardly and fastened to the disk, and formed larger than the first annular portion, wherein the vibration preventing portions are concentric with the first opening, formed at equal intervals on the first annular portion, and protruded in the axial direction.

2. The clutch of claim 1, wherein each of the vibration preventing portions extends from a surface of the elastic member to a first length (b) in a horizontal direction and a second length (a) in a vertical direction, and wherein the first length (b) extends longer than the second length (a).

3. The clutch of claim 1, wherein each of the vibration preventing portions extends from a surface of the elastic member to a first length (b) in a horizontal direction and a second length (a) in a vertical direction, and wherein the second length (a) extends longer than the first length (b).

4. The clutch of claim 1, wherein the elastic member has a second opening spaced at equal intervals in a circumferential direction between the first annular portion and the second annular portion.

5. The clutch of claim 1, wherein the vibration preventing portions are located at an intermediate position of the spaced-apart bridges.

6. The clutch of claim 1, wherein the vibration preventing portions are protruded in one of a polygonal shape, a rounded shape, and a triangular shape toward either an outer side or an inner side with respect to a surface thereof.

7. The clutch of claim 1, wherein each of the vibration preventing portions has a thickness of T1 and the elastic member has a thickness of T2, wherein the thickness of T1 is thinner than the thickness of T2.

8. The clutch of claim 1, wherein each of the vibration preventing portions has a thickness of T1 and an outwardly protruded height of the elastic member H, wherein the protruded height of H is any one height determined between 1.1T1 and 2T1.

9. The clutch of claim 1, wherein a length of each of the vibration preventing portions extends to a length corresponding to a radial length of the first annular portion.

10. The clutch of claim 1, wherein there are a plurality of attenuation members and the attenuation members are spaced apart from each other in the radial direction at a position where the bridges and the second annular portion are connected, and do not overlap with the vibration preventing portions in the radial direction.

11. A clutch comprising:
a pulley axially rotatably coupled to a rotation shaft of a compressor and receiving power from an external driving source;
a hub positioned to face the pulley in an axial direction and rotated together with the rotation shaft;
a disk coupled to the hub and rotated together with the hub;
a field coil assembly positioned inside the pulley and enabling the disk to move relative to the pulley by an electromagnetic force generated according to whether or not power is applied;
an elastic member positioned on an outer surface of the disk and including a plurality of first vibration preventing portions positioned in a radial direction with respect to a center of the hub and a plurality of second vibration preventing portions positioned along an outer edge; and
an attenuation member interposed between the disk and the elastic member.

12. The clutch of claim 11, wherein the elastic member further includes:
a first annular portion that has a first opening formed at a center thereof with a first diameter d1 and is coupled to the hub;
bridges spaced apart from each other at equal intervals at an edge of the first annular portion and extending outward in the radial direction; and
a second annular portion concentric with the first annular portion, formed integrally with ends of the bridges extending radially outwardly and fastened to the disk, and formed larger than the first annular portion,
wherein the first vibration preventing portions are formed on the first annular portion, and the second vibration preventing portions are formed on the second annular portion.

13. The clutch of claim 12, wherein the attenuation members are spaced apart from each other outward in the radial direction at a position where the bridges and the second annular portion are connected, and do not overlap with the first vibration preventing portions and the second vibration preventing portions in the radial direction.

14. The clutch of claim 11, wherein the elastic member is fastened to the hub by a first fastening member that is coupled to the hub from an outside of the elastic member; and a second fastening member that is coupled to the disk along an outermost edge of the elastic member, wherein the first fastening member and the second fastening member are concentric with the center of the hub and are spaced apart from each other at equal intervals, and do not overlap each other in the radial direction, and wherein the second vibration preventing portions are formed between the attenuation member and the second fastening member.

15. A compressor comprising:
a casing;
a compression mechanism that is provided inside the casing and compresses a refrigerant;
a rotation shaft that transmits a rotational force to the compression mechanism from a driving source provided outside the casing; and
a power transmission mechanism that selectively connects and separates the driving source and the rotation shaft,
wherein the power transmission mechanism includes a clutch comprising:
a pulley axially rotatably coupled to a rotation shaft of a compressor and receiving power from an external driving source;
a hub positioned to face the pulley in an axial direction and rotated together with the rotation shaft;
a disk coupled to the hub and rotated together with the hub;
a field coil assembly positioned inside the pulley and enabling the disk to move relative to the pulley by an electromagnetic force generated according to whether or not power is applied;
an elastic member positioned on an outer surface of the disk and including a plurality of vibration preventing portions formed in a radial direction with respect to a center of the hub; and
an attenuation member interposed between the disk and the elastic member.

16. A clutch comprising:
a pulley that is axially rotatably coupled to a rotation shaft of a compressor and receives power from an external driving source;
a hub that is positioned to face the pulley in an axial direction and rotated together with the rotation shaft;
a disk that is coupled to the hub and rotated together;
a field coil assembly that is positioned inside the pulley and enables the disk to move relative to the pulley by an electromagnetic force generated according to whether or not power is applied;
an elastic member that is positioned on an outer surface of the disk and includes a plurality of vibration preventing portions formed in a radial direction with respect to a center of the hub;

an attenuation member that is interposed between the disk and the elastic member, wherein the elastic member is fastened to the hub by a plurality of first fastening members coupled to the hub from an outside of the elastic member to be fastened to the hub, and a plurality of second fastening members coupled to the disk along an outermost edge of the elastic member, wherein the first and second fastening members are concentric with the center of the hub and are spaced at equal intervals, and do not overlap each other in the radial direction, and wherein the first fastening members are positioned between the spaced-apart vibration preventing portions, and the second fastening members are positioned to face the vibration preventing portions in the radial direction.

17. The clutch of claim 16, wherein the second fastening members are spaced radially outwardly with respect to the first fastening members, and positioned between adjacent ones of the spaced-apart first fastening members.

\* \* \* \* \*